United States Patent [19]

Hubbard

[11] 4,027,586

[45] June 7, 1977

[54] METHOD FOR PRINTING A MANUALLY SCANNABLE BAR CODE AND ARTICLES CARRYING A VERTICALLY EXTENDED BAR CODE

[75] Inventor: David W. Hubbard, Stamford, Conn.

[73] Assignee: Pitney-Bowes, Inc., Stamford, Conn.

[22] Filed: Dec. 14, 1973

[21] Appl. No.: 416,937

Related U.S. Application Data

[63] Continuation-in-part of Ser. No. 327,508, Jan. 29, 1973, abandoned.

[52] U.S. Cl. .............................. 101/93.01; 101/66; 101/90
[51] Int. Cl.² ........................................ B41J 1/32
[58] Field of Search ........... 101/90, 93 C, 426, 66, 101/93.01, 93.27; 197/113; 235/61.12 R, 61.12 N, 61.9 R

[56] References Cited

UNITED STATES PATENTS

| | | | |
|---|---|---|---|
| 2,670,067 | 2/1954 | Canham | 197/113 |
| 3,223,033 | 12/1965 | Sundblad | 101/90 X |
| 3,550,148 | 12/1970 | Machler | 197/1 R |
| 3,711,683 | 1/1973 | Hamisch | 235/61.12 N |
| 3,738,263 | 6/1973 | Combs et al. | 101/90 |

*Primary Examiner*—Edward M. Coven
*Attorney, Agent, or Firm*—Peter Vrahotes; William D. Soltow, Jr.; Albert W. Scribner

[57] ABSTRACT

Method and apparatus for printing a scannable bar code pattern is described. A high speed bar code printer produces a line spacing distance to a preselected value so that a plurality of identical horizontal lines of vertically oriented code bars may be printed in vertical overlapped relation so as to form a single vertically heightened bar code. This taller bar code pattern is more easily and efficiently scanned with the optical read head.

3 Claims, 4 Drawing Figures

METHOD FOR PRINTING A MANUALLY SCANNABLE BAR CODE AND ARTICLES CARRYING A VERTICALLY EXTENDED BAR CODE

CROSS-REFERENCES TO RELATED APPLICATIONS

This is a continuation in part of U.S. application Ser. No. 327,508 filed Jan. 29, 1973, now abandoned.

FIELD OF THE INVENTION

This invention relates to a method and apparatus for printing scannable machine readable bar codes on tickets such as labels, tags and the like.

BACKGROUND OF THE INVENTION

Machines, methods and tickets carrying machine readable bar codes to enable point of sale equipment to automatically identify articles sold by supermarkets, department stores and the like are well known. Typically, a ticket, which identifies a specific article of merchandise, is printed at the store and provided with both machine readable bar codes as well as alpha-numeric characters to enable visual article data identification. The printer locates a preselected pattern of vertically oriented bars along a horizontal line with the width of the bars and the spaces between them being varied in accordance with a predetermined code. The bar codes may include inventory identification data, price information, as well as any other desired data.

In many point of sale systems, the reading of a machine bar code is done by the cash register operator who is provided with a manually controlled wand which senses the optical differences presented by the bar code pattern on the ticket. The wand generates an electrical signal representative of the width of the bars and spaces between them. This signal is analyzed by the electronics in the point of sale equipment to produce a variety of functions such as transaction summarizing, inventory control and change calculation, etc. For example, an operator at the counter of a supermarket manually moves the wand to scan the bar code on the ticket attached to the item and thereby automatically enters identification data of the item as well as its price into the point of sale equipment.

One function of the point of sale equipment is to speed up the counter operation. As a result, the operator will quickly manually scan the bar code on the tickets. The tickets may be placed on a wide variety of surfaces (depending upon the item) so that in the process of moving a wand across conventionally low height bar code, care must be exercised to assure that the field of view of the wand remains within the bar code pattern.

As a practical matter, such care tends to slow down the operator whose attention must be continually and accurately focused on the bar codes to avoid straying off the line of the bar code. This high degree of care is, therefore, not consistent with the desired higher operating speed of a cash register operator.

One method for facilitating scanning of the bar code pattern involves an increase in the vertical height of a bar code by increasing the height of each line of printing bar codes. This method involves an expensive and elaborate modification of the printing equipment since the drums employed in printing bar codes normally accommodate a maximum bar height of about 3/32 of an inch. Such modification of the printer would increase its cost to the store where it is used.

SUMMARY OF THE INVENTION

In a method for printing a bar code pattern in accordance with the invention, a standard printer of a bar code of conventional height is modified to enable it to print successive lines of bar codes with horizontal registration and with slight vertical overlap to form a total bar code pattern that may be more conveniently scanned by manual or automatic reading devices.

With the method of this invention, the vertical line feed of a bar code printer is adjusted to print successive lines of bar codes with sufficient vertical overlap to form a continuous bar code pattern of extended height. The number of lines that are printed are selected to enable convenient and reliable scanning with, for example, a hand held wand across the entire bar code pattern without straying off the pattern. In this manner, a practical and convenient method for printing a reliably readable bar code pattern is obtained while utilizing a high speed printer having conventional character heights.

The term "ticket" as used in this application includes labels, sheets, or other recording media which are provided with bar code patterns for machine identification.

It is a still further object of this invention to provide high speed printing apparatus for printing vertically oriented scannable bar codes on a record member.

BRIEF DESCRIPTION OF THE DRAWINGS

These and other objects and advantages of the methods and articles carrying scannable bar code patterns formed in accordance with the invention will be understood from the following description of a preferred embodiment of the invention described in conjunction with the drawings wherein.

DETAILED DESCRIPTION OF THE EMBODIMENT

Figure 1:
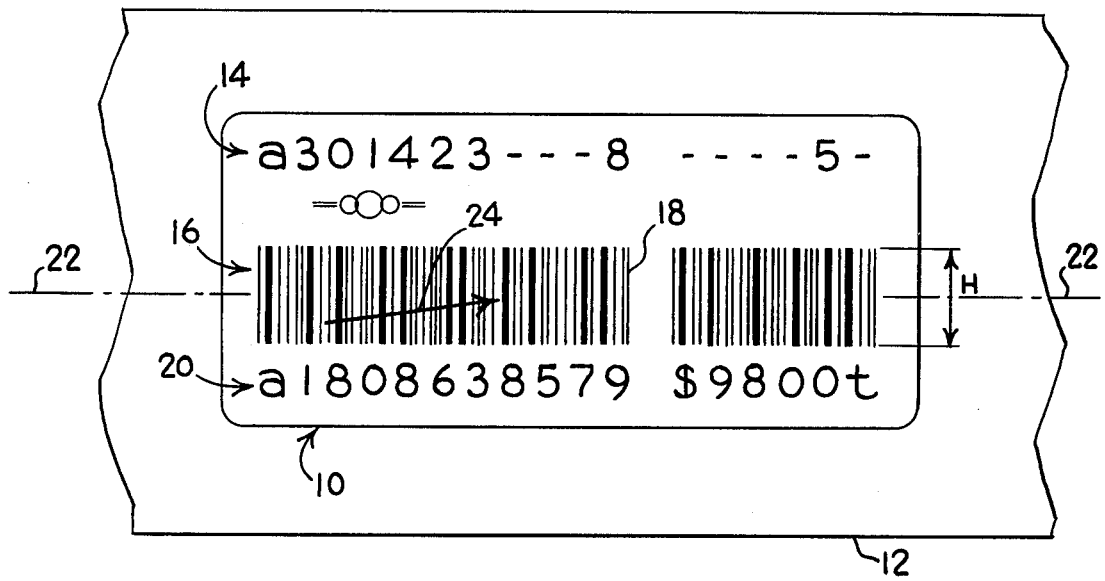
FIG. 1 is an enlarged view of typical ticket having printed thereon desired information in the form of eyeball readable data including alpha-numeric characters, and also machine readable data including an optical bar code pattern.

Referring to FIG. 1 there is shown a ticket 10 the back of which is provided with a pressure sensitive adhesive layer that allows the ticket to be releasably mounted on a suitable carrier strip 12. In use the ticket 10, after being printed on, is peeled off the carrier strip and applied to a desired item of merchandise so that when the item is presented at a point of sales counter, the ticket may be machine read and the coded data thereof thus entered into an associated data processing system. The ticket 10 is typically printed with a top line 14 of eyeball readable data in the form of alpha-numeric characters, a second line 16 of machine readable data in the form of optical code bars 18, and a third line 20 of eyeball readable data in the form of alpha-numeric characters.

When the bar code is to be machine read the ticket 10 and an optical read head are moved relative to one another along the length of the bar code line 16. Ideally the line or direction of scanning the ticket bar code should be parallel with the center line 22 of the code line 16, however, as a practical matter, it is difficult to accurately align the ticket with respect to the read head so as to get this parallel scan action, and in most cases the scan direction will actually extend at an angle with respect to said line 22, as illustrated by arrow 24. This being the case, it is desirable to make the height of the various code bars 18 as large as possible so as to increase this allowable angular deviation of scan direction 24. For example, in one application a one-fourth inch height for the code bar 18 has been found to be quite satisfactory for practical machine reading or scanning operation. Using code bars of this height, however, introduces a further practical problem as respects how these code bars will be printed in large numbers using available high speed printing equipment. Available printers are capable of printing characters such as shown in said lines 14 and 20 that are approximately three-thirty-seconds of an inch in height, however, such printers cannot simply be provided with type elements that are one-fourth of an inch in height to print the code bars 18 in that several prohibitive problems would arise, such as a resultant requirement for a very large increase in the character printing energy that is to be cyclically produced by the printer, etc.

The instant invention is directed to a method and means whereby tickets 10 having code bars 18 of increased height may be efficiently printed using a printer that is equipped with code bar type elements that are shorter in height than said code bars 18.

Figure 4:
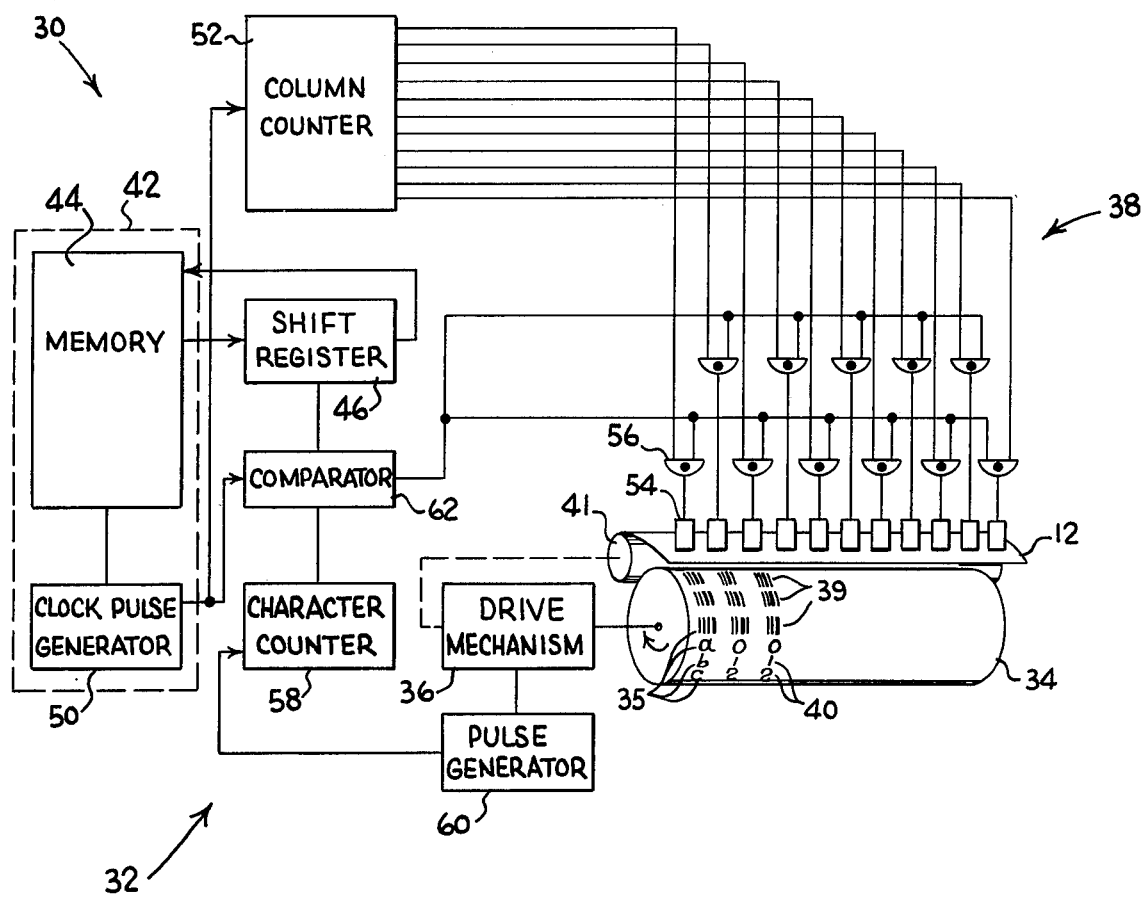
FIG. 4 is a schematic diagram of a high speed printer operative to print a bar code pattern on a record member according to the instant invention.

Referring now to FIG. 4, there is shown generally at 30 a serially operable high speed printing system which is capable of printing characters having bar codes 18 of increased height according to the present invention wherein each abbreviated bar code 26 is serially printed a line at a time. The high speed printing system 30 includes three basic components, an electronic data handling system 32 for serially presenting electrical output signals corresponding to the intelligence information which is to be printed, a continuously rotatable print drum 34 having type 35 thereon and an associated drive mechanism 36, and a printing network, generally designated 38. The print drum 34 has rows of bar code type 39 and rows containing alpha-numeric type 40. The printing network is selectively operable in response to the output signals from the data handling system 32 and in cooperation with the printing cylinder 34, to serially print on a record member or carrier strip 12 the intelligence information corresponding to the output signals.

Figure 3:
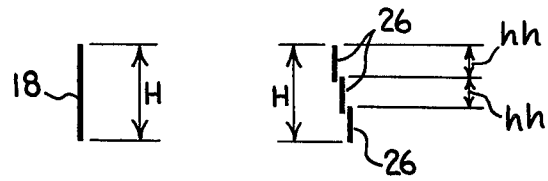

The printing system of FIG. 4 is capable of printing on a record member, or strip carrier, 12 line shaped marks in the form of bar code characters having a height such that when a line of bar codes is repeated in a successive line, there will be an overlapping as illustrated in FIG. 3. Each bar code character may be coded to represent a numeric digit from zero to nine, a stop signal, a start signal or any desired letter of the alphabet. The printing system 30 is shown to print only 11 characters in a line per ticket, but it will be appreciated more or less characters may be printed on a line with one pass, for example, 17 characters as shown in FIG. 1; however, for reasons of convenience only the printing of the group on the left side of the ticket 10 is illustrated and described. Thus, as shown in FIG. 4, the printing network 38 includes 11 print hammers 54, corresponding respectively to the 11 columns in the group on the left side of line 16 of FIG. 1. The record member 12 is supported by a drum 41 which is indexed or moved intermittently relative to the print drum 54, i.e., the record member remains stationary while one line of intelligence information is printed, and is then advanced an increment when the next line is to be printed. The increment by which the record member is moved is a distance not more than the circumferential extent of the bar code type 39.

The intelligence information to be printed is stored in a data storage unit 42 which includes a memory unit 44 for storing electrical signals corresponding to the successive characters of one line of intelligence information. The memory unit 44, which may be a magnetic drum, for example, is operable in cooperation with a shift register 46 to function as a circulating register in order to serially present at the output circuit of the shift register 46 electrical signals corresponding to the successive characters of the stored line of intelligence information. In addition, memory unit 44 is synchronized with a drive mechanism 36 in order to circulate the intelligence information through the shifting register 46 once for each type 35 represented on the printing cylinder 34, thereby assuring that a full line of information is scanned once for each character which may be printed during one revolution of the printing cylinder 34. After these successive scans, the drum 41 is rotated, or indexed, to start the printing of the next line.

Data storage unit 42 also includes a clock pulse generator 50 operable under the control of the memory unit 44 to apply a periodically recurring clock pulse signal to a column counter 52 which controls the operational sequence of the print hammers 54 by sequentially opening each of eleven respectively associated "and" gates 56 in accordance with the spacing in the line of intelligence information of the character represented by the output signal from the shift register 46.

In order to selectively energize the print drums 54 to print the proper characters 14, 18 and 20 on the record member 12, the data handling system 32 also includes component circuits for indicating the rotational position of the print drum 34 relative to the print hammers 54. Accordingly, the data handling system 32 includes a character counter 58 which is electrically indexed according to the position of the print drum 34 by an asociated pulse generator 60, which in turn, is operated under the control of the drive mechanism 36. The character counter 58 thus presents an electrical output signal corresponding to the type 35, on the print drum 34 which is in position to be printed. The output signal from character counter 58 is applied to a comparator circuit 62 which functions to compare the output signals from the shift register 46 and the character counter 58 in order to present an electrical output signal to energize a preselected one of the print hammers 54 whenever the signals presented by the shift register 48 and the character counter 58 correspond to the same information character.

The specific print hammer 54 which is energized to print is, of course, determined by which of the associated gates 56 has been opened by column counter 52. For example, if comparator 62 produces an output signal when the signal presented at the output circuit of the shift register 46 corresponds to the character in the fourth column of the stored line of intelligence information, the appropriate gate 56 will be enabled by column counter 52 and the forth print hammer 54 will therefore be enabled to print the desired character in the fourth column on strip 12.

Referrring now to FIG. 1, as described above, the first line 14 of the ticket 10 will be printed with the alpha-numeric characters as indicated and the drum 41 will be rotated an increment in order to place the record member 12 in a position to have the next line printed. The memory unit 44 will indicate there is nothing to be printed on the next line and the drum 41 will be rotated an increment again. The memory unit 44 then states the next three lines of information are duplicates of one another to yield the bar code shown at 16 of FIG. 1. After these three lines are printed, the record number 12 is indexed twice to provide a black space, the line 20 is printed with alpha-numeric characters, the record member 12 is indexed three times, and the system is then ready to print another ticket 10.

Figure 2:
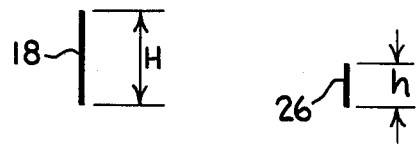
FIGS. 2 and 3 are diagrammatic sketches illustrating the instant printing method for generating the bar code pattern on the ticket.

Referring to FIG. 2, let it be assumed that each desired code bar 18 is to have a height H, and the code bar type element of the printer 30 is capable of printing a code bar 26 that has the same width as bar 18 but has a shorter height h. Such a printer may be used to generate a code bar 18 by modifying the line spacing means thereof so as described that the line spacing pitch hh, as indicated in FIG. 3, is less than the height h of one of said code bars 26, and so that when a plurality of such bars are printed one directly vertically beneath the other the thus overlapped printed bars 26 will collectively define the desired code bar 18 having a height of H. The three bars in FIG. 3 are shown slightly offset horizontally for the sake of explanation, it being understood that such bars, when printed in vertically aligned relation will form a bar such as 18 of height H.

In practice then, when a line 16 of code bars 18, such as shown in FIG. 1, is desired to be printed on a ticket 10, a high speed printer as described above can be used to print a first line of code bars that defines the desired data, and then the ticket can be line spaced through a shortened distance corresponding to hh of FIG. 3 so that a second line of identical code bars may be printed, the code bars of said second line being vertically aligned and overlapping with the respectively corresponding code bars of said first line. As many additional lines of identical overlapping code bars may be printed as may be needed to generate the necessary height H for the desired composite bar 18.

As may be seen each ticket 10 may thus be printed with successive vertically registered and overlapping lines of relatively short code bars so as to thereby generate the desired line 16 of relatively tall code bars 18.

It will be understood that the dimensions noted above are for purposes of illustration and are not intended to be limiting in any way.

Having thus described a method for printing bar codes on recording media such as tickets and the like to enable reliable manual scanning, the advantages of the invention may be understood.

What is claimed is:

1. In a method of printing a bar code pattern on a recording medium, the steps comprising:
    placing the recording medium in a printing position within a high speed bar code printer that prints individual code bars along horizontal lines; and
    printing successive identical vertically aligned horizontal lines of said code bars with a vertical overlap of the respective corresponding code bars of said lines until a composite bar code pattern is generated having a vertical height greater than that for said individual code bars.

2. The method defined by claim 1 additionally comprising:
    printing an additional line of alpha-numeric characters on said recording medium, the vertical height of said characters being substantially the same as that for said individual code bars.

3. In a method of printing lines of vertically oriented readable optical bar codes on a ticket with an automatic high speed bar code printer which prints the bar codes along horizontal vertically spaced lines, the improvement comprising:
    printing a first horizontal line of vertically oriented code bars on a ticket; and
    printing a second identical horizontal line of vertically oriented code bars on said ticket in registration with the first horizontal line of bar codes and with the ends of the respective code bars of said second line being in vertical registry and ovelapped relationship with the ends of the respectively adjacent code bars of said first horizontal line whereby a single line of a bar code pattern having an accumulated height that is greater than the height of either of said first and second horizontal lines is thereby formed on the ticket.

* * * * *

UNITED STATES PATENT AND TRADEMARK OFFICE
CERTIFICATE OF CORRECTION

PATENT NO. : 4,027,586
DATED : June 7, 1977
INVENTOR(S) : David W. Hubbard

It is certified that error appears in the above-identified patent and that said Letters Patent are hereby corrected as shown below:

Claim 3 - Column 6, line 41, change "ovelapped" to

-- overlapped --.

Signed and Sealed this

Fourth Day of July 1978

[SEAL]

Attest:

RUTH C. MASON
*Attesting Officer*

DONALD W. BANNER
*Commissioner of Patents and Trademarks*